Oct. 7, 1969   E. BRICHARD ET AL   3,470,776
APPARATUS FOR THE REMOTE CONTROL DISPLACEMENT OF A TOOL
Filed Feb. 28, 1967   4 Sheets-Sheet 1

INVENTORS
Edgard Brichard &
André Raes
BY *Spencer & Kaye*
ATTORNEYS

Oct. 7, 1969  E. BRICHARD ET AL  3,470,776
APPARATUS FOR THE REMOTE CONTROL DISPLACEMENT OF A TOOL
Filed Feb. 28, 1967  4 Sheets-Sheet 2

INVENTORS
Edgard Brichard &
André Raes
BY Spencer & Kaye
ATTORNEYS

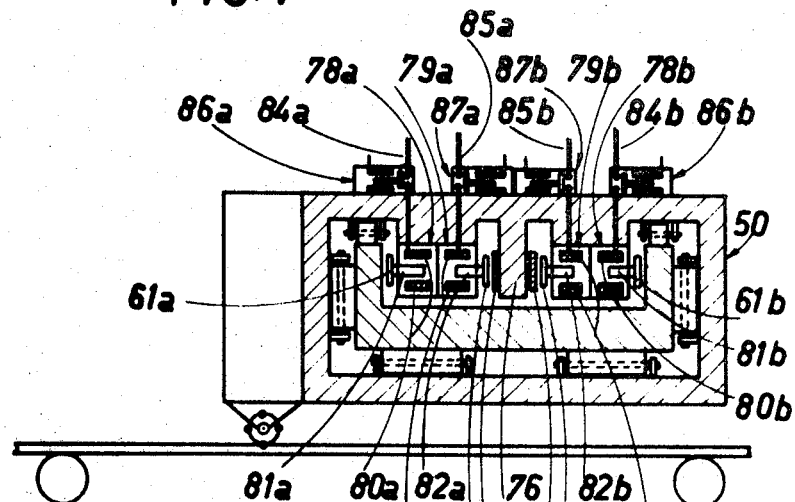
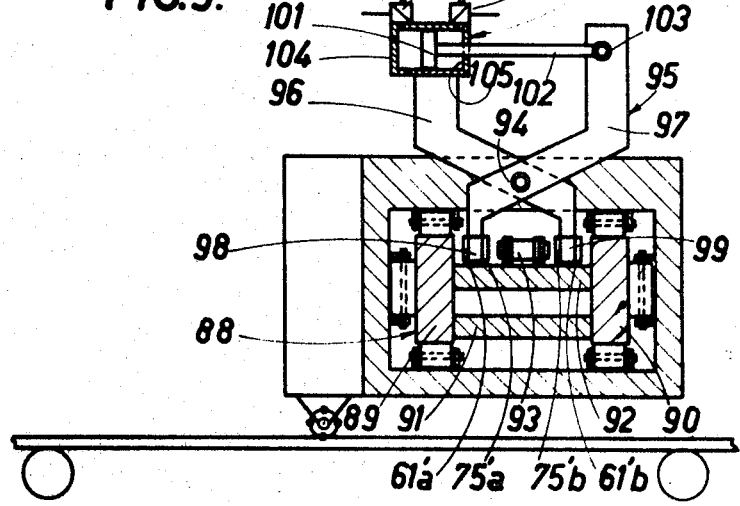

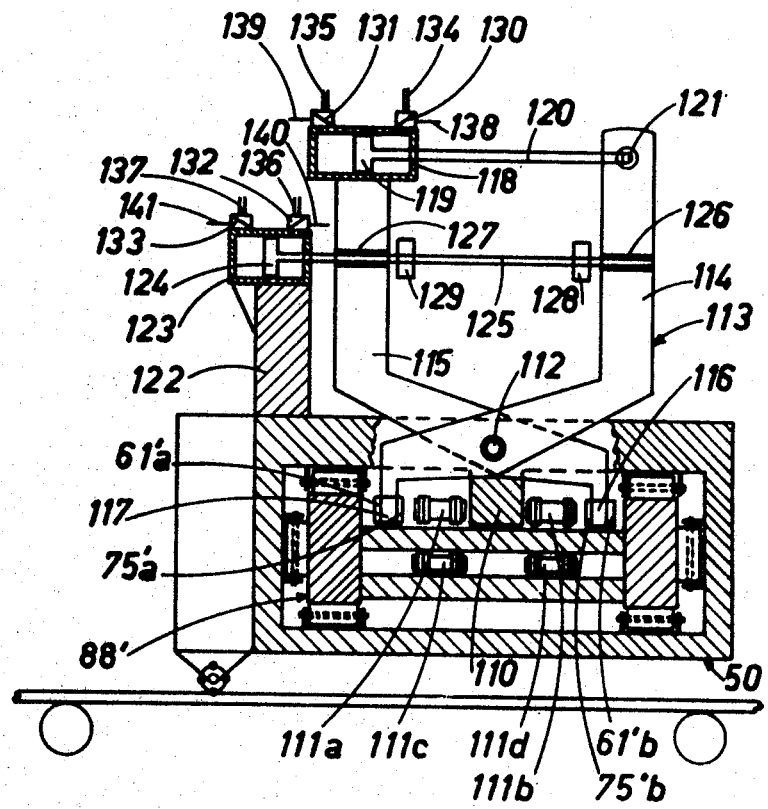

United States Patent Office 3,470,776
Patented Oct. 7, 1969

3,470,776
APPARATUS FOR THE REMOTE CONTROL
DISPLACEMENT OF A TOOL
Edgard Brichard, Jumet, and André Raes, Balen, Nette,
Belgium, assignors to Glaverbel S.A., Brussels, Belgium
Filed Feb. 28, 1967, Ser. No. 619,319
Claims priority, application Luxembourg, Mar. 14, 1966,
50,649
Int. Cl. B26d 5/08
U.S. Cl. 83—11                                    14 Claims

ABSTRACT OF THE DISCLOSURE

Apparatus for remotely controlling the displacement of a tool which is supported by a tool holder carrying at least one selectively actuatable clutch element and at least one selectively actuatable stopping element, the clutch element being arranged so that when it is actuated it couples the tool holder to a continuously advancing driving element, while the stopping element is arranged so that when it is selectively actuated, and when the clutch element is deactuated, the stopping element couples the holder to a stationary part, thus locking the holder at a given position.

Background of the invention

The present invention relates to automatic tool positioning and particularly to the remote control displacement of a tool along a predetermined path.

Apparatus according to the present invention is primarily intended to be used for accurately positioning a glass cutter in the path along which sheet glass is conveyed as it leaves a sheet glass manufacturing plant.

The cooled glass continuously leaving such a plant has to be cut both transversely and longitudinally to form sheets of predetermined sizes. The longitudinal cutting is performed by cutters supported from above the path of travel of cooled sheet glass so as to cut or score the glass longitudinally as it moves through the cutting station.

The transverse, or lateral, location of the longitudinal cutters across the path of the glass must be changed from time to time and, for this purpose, it is known to mount the cutters on holders which are transversely displaceable along a guide installed above the path of the glass.

I has already been proposed to connect such cutter holders to control rods which can be manipulated by an operator from one end of the guide for the purpose of moving the cutters into predetermined cutting positions and locking them in such positions preparatory to cutting, but such a control system does not provide for the speed or accuracy of control which is to be desired. Speed is obviously important when one is making positional adjustments of cutters while the sheet of glass continues to pass through the cutting station. Such positional adjustments have to be made to provide sheets of various sizes as determined by market demands.

If the lateral positions of the cutters must also be changed to take into account the positions of manufacturing defects in the glass as signaled by detection devices upstream of the cutting station, swift cutter displacement under automatic control is particularly important.

A cutting machine for longitudinally cutting paper webs has been described in French Patent No. 1,326,803 and comprises a system of cutter holders each carrying its own electric driving motor which propels the holder along a guide under remote control. The cutter control system described in this French specification does not provide a solution to the problems now in view as outlined above, largely because of the appreciable inertia of the cutter holders. This inertia, which is of course due to the weight of the driving motors, is inimical to the rapid translation of the cutters from one cutting position to another because of the time taken up in accelerating the cutters from rest and in slowing them down as they approach their new cutting positions.

Summary of the invention

It is therefore a primary object of the present invention to eliminate these drawbacks and difficulties.

Another object of the present invention is to move such cutter holders to desired positions in a rapid and accurate manner.

A further object of the present invention is to reduce the weight of the portions of the apparatus to be moved.

Yet another object of the present invention is to provide for the accurate remote control positioning of such cutter holders.

Yet another object of the present invention is to permit selected cutter holders to be moved simultaneously in respectively opposite directions.

These and other objects according to the present invention are achieved by the provision of apparatus for the the weight of the portions of the apparatus to be moved. remote control displacement of at least one tool to a desired position along a predetermined path. The apparatus according to the present invention essentially includes a guide member, at least one tool holder, driving means mounted for movement parallel to such path, selectively actuatable clutch means and selectively actuatable stopping means. The tool holder is arranged for holding the at least one tool and is mounted on the guide member for displacement with respect thereto along the predetermined path. The clutch means are carried by the tool holder in operative association with the driving means for selectively coupling the holder to the driving means, while the stopping means, which are also carried by the tool holder, are in operative association with a stationary part for selectively coupling the holder to the part so as to lock the holder a any desired position along such path.

The present invention makes use of a tool holder which is displaceable along a guide by a driving motor under the influence of a control exerted at a location remote from the holder, but the driving motor is not itself displaced and, as a consequence, the holder can be much more rapidly accelerated than a holder carrying its own driving motor. This result is achieved by providing a driven carrier device which in operation is displaced parallel with the guide, and by equipping the tool holder with a clutch which can be actuated, by remote control, for coupling the holder to the carrier device. In addition, the tool holder has a part, which may be integral with the clutch, which is movable under remote control into contact with the guide or another fixed part for locking the tool holder in any position along the guide.

While, as already indicated the invention has been made primarily for use in a glass cutting installation, it is capable of use in other types of machine, e.g., machines for automatically marking sheet materials during the conveyance thereof. The construction of the tool holder in any given embodiment of the invention will of course in part depend on the type of tool which is to be held.

The driven carrier device may comprise at least one endless belt, chain, or the like mounted in such a manner that at least one of its spans, or reaches, travels parallel with the guide and is so positioned that it can be engaged by the clutch on the tool holder. If both reaches of such an endless carrier travel parallel with the guide and close to the clutch, the latter can be designed for selectively engaging one or the other reach of such carrier. In that way, one and the same carrier can be used for moving the tool holder in etiher direction along the guide. As an alternative it is of course possible to employ two endless carriers which are driven in opposite directions.

The use of a carrier device comprising one or more endless belts or the like affords the advantage that the device can be continuously driven without interruption so long as the apparatus is in use and the carrier device and the power transmitted thereby is instantly available at any moment for displacing the tool holder from whatever position it occupies along the guide.

As an alternative to the use of an endless carrier, a carrier device which is linearly displaced by a screwthreaded spindle may be used. In that case the direction of displacement depends upon the direction of rotation of the spindle.

Brief description of the drawings

FIGURE 4 is a view similar to that of FIGURE 2 of another modified form of construction of the arrangement shown in FIGURE 2.

FIGURE 5 is a view similar to that of FIGURE 2 of yet another modified form of construction of the arrangement of FIGURE 2.

FIGURE 6 is also a view similar to that of FIGURE 2 of a further modified form of construction of the arrangement shown in FIGURE 2.

Description of the preferred embodiments

Figure 1:
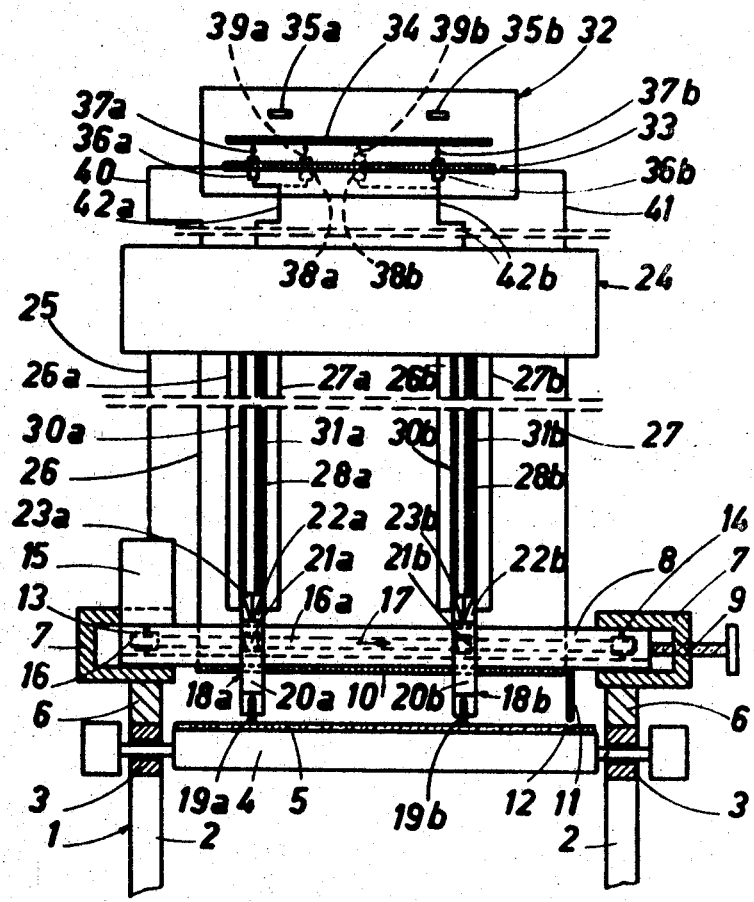
FIGURE 1 is an elevational view, partly diagrammatic and partly in cross section, of one embodiment of the present invention.

FIGURE 1 shows an installation for use in longitudinally cutting glass sheets during their transportation in a direction perpendicular to the plane of the drawing and in a horizontal plane on a conveyor 1. This conveyor includes a fixed frame having vertical side supports 2 and side longitudinal members 3 defining guide channels in which transporting rollers 4 are rotatably mounted for conveying sheets of glass laid thereon. The drawing shows a glass sheet 5 in position on the conveyor.

The cutting apparatus is supported on bearings 6 and rigidly connected to supports 2 and includes horizontal side channel members 7, of channel section, which accommodate the ends of a guide member 8 which is also of U-shaped cross section. The lateral position of the guide member 8 in the side channels defined by members 7 can be adjusted by means of a screw 9. The resistance 10 of a linear potentiometer extends across the bottom of the guide member 8, and near one of its ends the guide member 8 carries a pointer 11 which facilitates the correct lateral pre-positioning of the guide member. This pre-positioning is achieved by moving the guide member in a lateral direction, by advancing the screw 9, until the pointer 11 is directly above a scored line 12 extending in a longitudinal direction (i.e. perpendicular to the plane of the drawing), adjacent one edge of sheet 5 and serving as a reference line in relation to which the other longitudinal cutting positions are determined.

Pulleys 13, 14 are mounted in the guide 8 adjacent its ends. Pulley 13 is coupled to a mechanical power source and speed reducing gear 15, while pulley 14 is mounted to rotate freely. An endless belt 16 extends around the two pulleys 13 and 14. One span or reach, of the belt 16 is shown in broken lines and is labeled 16a. When the belt is driven, the span, or reach 16a moves in the direction of the arrow 17, the opposite span or reach, of belt 16 moving in the opposite direction.

A pair of tool holders 18a and 18b are slidably mounted on the guide 8. Each of these tool holders carries a respective one of the discs 19a and 19b carrying cutting wheels (not shown) at their peripheries. Each tool holder also carries a respective one of the position-detecting members 20a and 20b, each composed of a slider which contacts the resistance 10 on the guide 8, a respective one of the pneumatic clutch members 21a and 21b, which are connected to an air pressure source (not shown) by a respective set of flexible air lines 30a, 31a and 30b, 31b, and a respective set of the electrically operated valves 22a, 23a, and 22b, 23b, which control the air supply to the clutches for coupling and uncoupling the tool holders from the belt 16.

As will hereinafter be described, the automatic displacement of the tool holders 18a and 18b in a lateral direction along the guide member 8 to desired positions occurs in response to electrical signals from a control unit. It is necessary for the impulses transmitted to an electrically operated clutch valve for moving a tool holder to depend both on the final position to be assumed by the tool holder, as signaled by the control unit 32, and on the actual position of the tool holder along the guide at any given time. For this purpose, a conventional comparator 24 is used. This comparator is connected to the reducing gear 15 and the linear potentiometer resistance 10 by flexible cables 25, and 26–27, respectively, and to the clutch valves 22a, 23a, and 22b, 23b by flexible cables 26a–27a–28a and 26b–27b–28b, respectively.

The control unit 32 incorporates a linear potentiometer resistance 33, a graduated visual scale 34 and two pushbutton switches 35a and 35b. There are two potentiometer sliders 36a and 36b which carry indicator needles 37a and 37b, respectively. The sliders are movable along the resistance 33 to any required positions, which is indicated on the scale 34, e.g., to the positions shown in broken lines where in the sliders and their needles are noted 38a, 38b and 39a, 39b, respectively. The control unit is connected to the comparator 24 by two cables 40 and 41 each extending from a respective end of the potentiometer resistance 33, and by cables 42a and 42b extending from the potentiometer sliders.

The installation illustrated in FIGURE 1 operates as follows:

After a mark 12 has been made at an appropriate position near the edge of a sheet of glass 5 on the conveyor 1, the horizontal guide member 8 is adjusted by the screw 9 to bring the locating rod 11 in line with this mark 12. When these preliminary operations have been completed, the potentiometer sliders 36a and 36b of the control unit are moved, e.g., manually to bring their indicator needles 37a and 37b into the positions on the scale 34, e.g., 39a and 39b, which correspond with the distances from the mark 12 at which the cutters 19a and 19b on the tool holder must be located for cutting the sheet glass as it travels in a longitudinal direction beneath the tool holders. These positions may depend on the locations of manufacturing defects on the glass sheet, on the sheet sizes required to satisfy particular orders, and on other factors. The best cutting positions, taking the above factors into account, may be determined by a computer. It will be assumed in the following description that the sliders on the control unit are moved into the required positions 38a and 38b shown in broken lines in FIGURE 1.

Once the sliders on the control unit have been preset to these positions, the switches 35a and 35b are switched on to start the drive of belt 16 at high speed and to initiate the transmission to the clutch valves of a program of control signals from comparator 24, which program is dependent on signals deriving in part from the tool holders 18a and 18b, through their potentiometer sliders 20a and 20b, and in part from the control unit 32.

The comparator circuitry is designed so that the following sequence of operations occurs: Firstly, the clutch valves are operated so that the clutch 21a of tool holder 18a connects this tool holder to the reach 16a of the belt 16 and clutch 21b connects tool holder 18b to the other reach of the belt. Consequently, the tool holder 18a is displaced rapidly to the right, as seen in FIGURE 1, and tool holder 18b is displaced at the same speed but in the opposite direction.

The distances to be moved by the two tool holders are commensurate with the distances over which the sliders on the control unit 32 were moved from their original positions 36 to their required positions 28. It will be noted that the total distance to be traversed by the tool holder 18a is less than that to be traversed by tool holder 18b. When the tool holder 18a arrives at a particular predetermined distance from its required cutting position, the clutch 21a is automatically temporarily released and the tool holder comes to a standstill. The clutch 21b remains in engagement with the belt 16, however, so that tool holder 18b continues to move to the left. As soon as tool holder 18b reaches a position in which it is at the same distance from its desired cutting position as the tool holder 18a is from its desired cutting position, the clutch 21a is again actuated to connect the tool holder 18a to the belt and, simultaneously with this operation, signals are transmitted to the reduction gearing 15 of the belt drive to bring about a substantial reduction in the speed of the belt. Consequently, the two tool holders move simultaneously at relatively low speed towards their new cutting positions, which they reach simultaneously, and at this moment control signals from the comparator 24 release the clutches from the driving belt and lock the holders to the guide member 8.

Since the actual position of each tool holder at any given time is registered in the comparator 24, it does not matter if the tool holder 18a continues to move over a short distance after the instant when it is temporarily released from the belt.

It will be clear that the installation could be modified to incorporate only one or to incorporate more than two tool holders for displacement along the guide 8. Devices capable of carrying out the functions of comparator 24 are well known in the art, one such arrangement being described in the above-mentioned French Patent No. 1,326,803, so that these devices will not be described in greater detail herein.

In FIGURE 1 the details of the clutch mechanisms are not shown. Many different types of clutch mechanisms can be used, the precise type of clutch mechanism used being of secondary importance. Moreover, other forms of telemetering system may be used in the control of the tool holder positions, e.g. a system incorporating a precision rack and pinion mechanism instead of the linear potentiometer 10 and the cooperating sliders.

In the other figures of the drawings which will now be referred to various constructions of tool holders and clutch mechanisms are shown and they will be described in detail. It will be apparent from these other embodiments of the invention that it is not necessary to use a belt for displacing the tool holders.

The other figures, i.e., FIGURES 2 to 6, show only the tool holder, or one of the tool holders, of various forms of construction of the apparatus and the associated guide and clutch mechanism. The instrumentation for remotely operating the clutch mechanism according to a given schedule may embody a comparator and control unit functioning similarly to the corresponding parts of the installation described above in connection with FIGURE 1.

Figure 2:
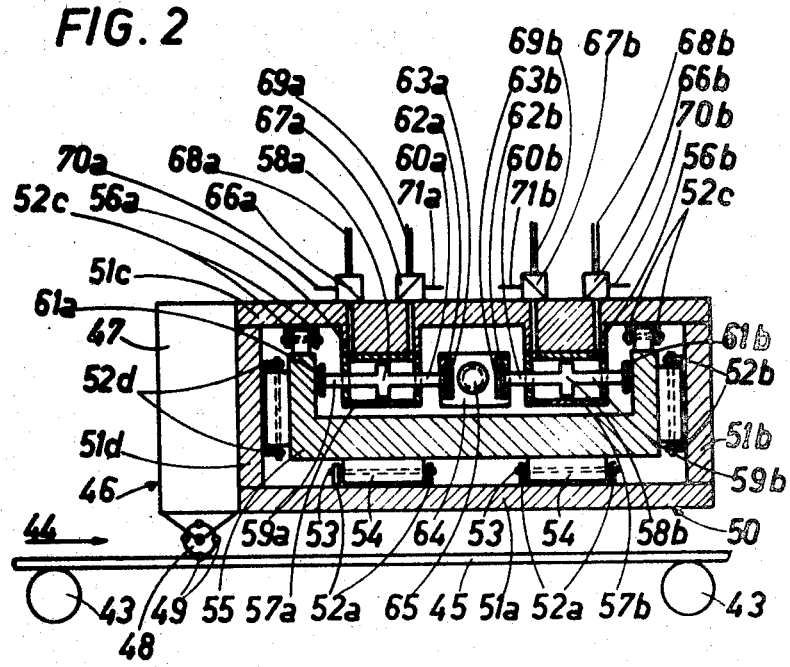
FIGURE 2 is a cross-sectional elevational view of one form of construction of a portion of the device in FIGURE 1.

In FIGURE 2, the parts 43 constitute two rollers of a roller conveyor system carrying a sheet of glass 45 in the direction indicated by an arrow 44. Disposed above the path along which sheets of glass are advanced by the conveyor is a tool holder 46. A portion 47 of the tool holder houses a mechanism (not shown) for raising and lowering a disc 48 carrying four cutting wheels 49. The mechanism for manipulating the disc 48 in this way is tied into the control system for the tool holder so that the disc is raised automatically just prior to any displacement of the tool holder (e.g. at the instant when the tool holder is unlocked from its guide member) and is lowered automatically when the tool holder reaches its new position (e.g. a fraction of a second after the tool holder is again locked to the guide member). Another portion of the tool holder 46 includes a casing 50 formed by an assembly of four metal plates 51a, 51b, 51c and 51d. The casing is in the form of a sleeve having a rectangular cross section and open at its ends. Brackets 52a, 52b, 52c and 52d are secured inside the casing and support the axle pins 53 of six bearing rollers 54. The rollers 54 allow the tool holder to move smoothly along a guide member 55 against which the rollers bear and which is an equivalent of the member 8 of FIGURE 1.

On the inside face of the top plate 51c of the casing 50 there are provided two downwardly projecting portions 56a and 56b to which metal cylinders 57a and 57b, respectively, are attached. These cylinders house double-acting pistons 58a and 58b, respectively, with piston rods 59a and 60a of piston 58a and 59a and 60b of piston 58b, projecting through respective opposite ends of their associated cylinders. The piston rods 59a and 59b have at their free ends metal plates 61a and 61b, respectively. The piston rods 60a and 60b have attached to their free ends metal plates 62a and 62b, respectively, which intrude into grooves 63a and 63b, respectively, formed in a block 64 which is in screw-threaded engagement with a horizontal spindle 65. This spindle is connected to a driving motor (not shown) through a reducing gear which is also not shown but which is equivalent to the reduction gear unit 15 of FIGURE 1.

The pistons 58a and 58b, with the plates carried by their rods, form clutch members which are operated pneumatically under the control of electrically operated valves 66a–67a and 66b–67b, respectively, disposed above the casing 50 and connected into air lines 68a–69a and 68b–69b, respectively, which are connected all to a compressed air source (not shown). The valves communicate with the cylinders of the clutch members through passages in the top plate 51c of the casing 50. The valves are actuated by control signals transmitted via wires 70a–71a and 70b–71b.

When control switches equivalent to the switches 35a and 35b of FIGURE 1 are closed, the spindle 65 rotates at a high speed in the direction required for causing the block 64 to move in the direction in which the tool holder has to be displaced. At the same time a program of electric control signals is transmitted to the valves 66a and 66b. Initially, impulses are transmitted via wires 70a and 70b and selectively actuate the valves 66a and 66b so as to cause the pistons 58a and 58b to be moved to the right and left, respectively, as viewed in the figure. By this displacement of the pistons, their plates 62a and 62b become pressed against the block 64, thus coupling the tool holder 46 to the block so that the tool holder advances laterally (in a direction perpendicular to the plane of the figure) together with the block relative to the spindle 65 and the guide member 55. Under the influence of subsequent electrical signals, the speed of rotation of the spindle is reduced when the tool holder reaches a position a short distance from its required cutting position and the tool holder then continues its movement at the slower speed until it reaches that final position. At this moment, control signals transmitted via wires 71a and 71b actuate the valves 67a and 67b to cause the pistons 58a and 58b to move in directions away from the block 64 so that the plates 61a and 61b of the clutch members become pressed firmly against the guide member 55, thereby substantially instantaneously braking the tool holder in its final cutting position.

If two or more tool holders of the type shown in FIGURE 2 are mounted for displacement along the spindle 65, it is of course necessary for the program of control signals to be able temporarily to release the clutch member of one tool holder (as in the installation described with reference to FIGURE 1) if it reaches a position which is at a short predetermined distance from its new cutting position before the other tool holder(s). To this end, the block 64 may be replaced by a cylindrical part in threaded engagement with spindle 65 and the plates 62a and 62b may be arranged to cooperate with separate shoes shaped to cooperate with the outer cylindrical surface of the block and interposed between the plates and the block. In that case, when the shoes are spaced from the block, the latter rotates with the spindle and does not advance laterally therealong until the plates 62a and 62b clamp the shoes against the block, thus terminating the rotation of the block and causing it to be advanced laterally under the influence of the rotation of spindle 65. If different tool holders 46 are to be displaced in opposite directions by means of the one spindle, the opposite displacements must be effected successively since the spindle can only advance the block 64 in one lateral direction at a time.

Figure 3:
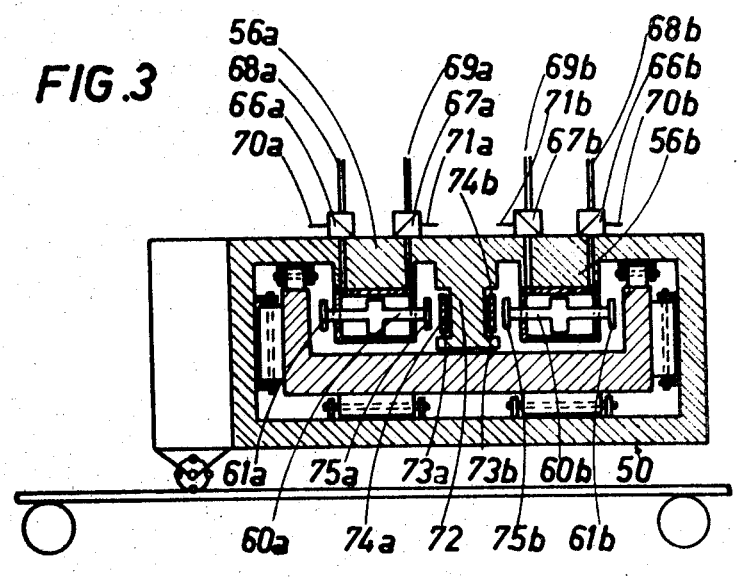
FIGURE 3 is a view similar to that of FIGURE 2 of a modified form of construction of the arrangement shown in FIGURE 2.

A further tool holder construction and drive permitting tool holders to be moved simultaneously in opposite directions is shown in FIGURE 3. The construction of the illustrated tool holder is basically similar to that shown in FIGURE 2 and the same reference numerals are used to denote corresponding parts in the two figures.

The system of FIGURE 3 differs from that shown in FIGURE 2 in the following respects: The casing 50 has an internal projection 72 which extends downwardly between the two clutch members. Grooves 73a and 73b in the opposite sides of this projection guide the opposed reaches 74a and 74b, respectively, of an endless belt which is made of synthetic material and which is driven via a reducing gear (not shown). In the embodiment illustrated by FIGURE 3, this belt takes the place of the screw-threaded spindle 65 and the block 64 associated therewith in the embodiment of FIGURE 2. When the tool holder is to be displaced, it is connected, through the intermediary of one of its clutch members, with one or the other reach of the belt, depending on the required direction of displacement. Two or more tool holders can be mounted for displacement by the same belt and different tool holders can be moved simultaneously in opposite directions by connecting them, through appropriate clutch members, with respective opposed reaches of the belt, or simultaneously in the same direction by connecting them with the same reach of the belt.

The signaling control system for a tool holder as shown in FIGURE 3 may be similar to that shown in FIGURE 1, taking the valves 66a and 67a of FIGURE 3 to be equivalent in function to the valves 22a and 23a of tool holder 18a of FIGURE 1, and valves 66b and 67b of FIGURE 3 as equivalent to valves 22b and 23b of tool holder 18b of FIGURE 1.

Reference is now made to FIGURE 4. The tool holder shown in this figure has many points of similarity with the tool holder of FIGURE 3. The casing 50 has a central internal projection 76 which extends between the two reaches 77a and 77b of an endless metal belt which is driven by a reducing gear (not shown).

The clutch members for connecting the tool holder with one or the other reach of the belt, or with the guide member along which the tool holder is guided, again include metal plates 61a, 61b, 62a and 62b, but in this embodiment the plates of each clutch member are independently movable. The outer clutch plates 61a and 61b are actuated by electromagnets 78a and 78b, respectively, each including a respective one of the coils 80a and 80b and the armatures 81a and 81b, with each plate being rigidly connected to a respective armature. The inner clutch plates 62a and 62b are actuated by electromagnets 79a and 79b, respectively, each including a respective one of the coils 83a and 83b and armatures 82a and 82b with each inner plate being rigidly connected to a respective armature. The electromagnets are supplied with electric current via lines 84a, 85a, 84b and 85b into which relays 86a, 87a, 86b and 87b, respectively are connected, each of the relays being electrically connected to be operated by control signals supplied by a suitable control unit. Apart from the fact that the clutches are actuated electrically rather than pneumatically, the function of the apparatus corresponds with the function of the apparatus shown in FIGURE 3.

FIGURE 5 shows a tool holder of substantially different construction and arranged to move laterally along a guide member in the form of a box girder 88 having vertical walls 89 and 90 connected to two horizontal walls 91 and 92. The driving member is constituted by a roller chain 93 driven by a reducing gear (not shown). The clutch is in the form of a tong device 95 composed of a pair of levers 96 and 97 which cross one another and pivot about a common pivot pin 94 mounted in a slot in the top of the casing of the tool holder. The lower ends 98 and 99 of the tong levers carry the clutch plates 61'a-75'a and 61'b-75'b, respectively. The upper arms of the levers are interconnected by a piston and cylinder unit consisting of a metal cylinder 100 secured to lever 96, and a piston 101 connected to one end of a piston rod 102 whose other end is pivotally connected at 103 to lever 97. The interior of metal cylinder 100 communicates with two conduits 106 and 107 supplying compressed air, each conduit being disposed adjacent a respective one of the ends 104 and 105 of the cylinder. The conduits 106 and 107 are fitted with electrically operated valves 108 and 109, respectively, which are responsive to control signals from a suitable control unit.

The clutch levers can be moved from the positions illustrated, in which the tool holder is disconnected from both the chain 93 and the guide member 88, into a position in which the clutch plates 75'a and 75'b grip the roller chain 93 so that the holder moves therewith, or into a position in which the clutch plates 61'a and 61'b are pressed firmly against the vertical walls 89 and 90 of the guide member and maintain the holder stationary.

Reference is now made to the tool holder and drive system shown in FIGURE 6. In this embodiment, the tool holder casing 50 has an internal projecting piece 110 which extends downwardly between the top reaches 111a and 111b of two roller chains driven via reducing gears (not shown). The other reach 111c or 111d of each chain passes between two horizontal plates forming part of the guide member 88'. The clutch is a tong device 113 composed of a pair of levers 114 and 115 which cross each other and which pivot about a common pivot pin 112 mounted in a slot in the top of the tool holder casing. The lower ends 116 and 117 of the clutch levers carry clutch plates 61'b-75'b and 61'a-75'a, respectively. The upper arms of the clutch levers are interconnected by a piston and cylinder unit composed of a cylinder 118 secured to lever 115, and a piston 119 which is connected to one end of a rod 120 whose other end is pivotally connected at 121 to lever 114.

A metal bracket 122 on the casing 50 supports a second metal cylinder 123 carrying a piston 124 whose piston rod 125 is slidably disposed in two apertures 126 and 127 formed at the same level in the two clutch levers 114 and 115, respectively. The piston rod 125 carries two stops 128 and 129 at points located between the two levers.

Electrically operated valves 130 and 131 control the supply of air to and from the cylinder 118 via conduits 134 and 135. These valves are connected to an electrical control unit by wires 138, 139. The piston and cylinder unit 123-124 is operated by compressed air delivered via conduits 136 and 137 under the control of electric signals transmitted by wires 140 and 141 to electrically operated valves 132 and 133, respectively.

In operation, the two driving chains are driven in opposite directions. The clutch member is operated to connect the tool holder to one or the other of the chains depending on the required direction of displacement of the tool holder. The purpose of the second piston and cylinder unit carrying the stops 128 and 129 is to hold one of the clutch levers stationary while the other lever is moved. Suppose, for example, that the tool holder is to be engaged with the reach 111b of the right-hand driving chain. A control signal is transmitted to valve 133 to move the piston 124 to the right to bring the stop 128 into contact with the arm 114. This blocks the lever 114 in its illustrated "neutral" position. Then, a further group of control signals is transmitted to the valve 130 to cause compressed air to enter cylinder 118 at the right-hand side of piston 119. The piston itself can not move under the influence of the air pressure because lever 114 is blocked, and the compressed air thus causes the cylinder 118 to move to the right with respect to the piston so that the clutch plate 75'b of lever 115 moves against the upper reach 111b of the right-hand driving chain and clamps this reach against the projection piece 110 in the tool holder casing, thereby causing the right-hand chain to drive the tool holder. When the tool holder reaches its required new position along the guide member 88', signals are transmitted to the valve 131 to cause compressed air to move the lever 115 in the opposite direction (i.e., back to its "neutral" position), a further control signal is transmitted to the valve 132 for causing the stop 128 to move away from the lever 114, and a third control signal is then transmitted to valve 131 to cause both clutch levers to pivot simultaneously so as to press the clutch plates 61'a and 61'b against the guide member 88', thereby braking the movement of the tool holder.

As is the case for the systems according to FIGURES 3 and 4, the tool holder and drive systems shown in FIGURE 6 are suitable if it is required to drive two or more tool holders and if it is required to dispose of the power to simultaneously move different tool heads in respectively opposite directions.

It will be readily appreciated that one of the most advantageous features of the present invention resides in the fact that the response of the tool holders to position-changing signals is practically instantaneous so that the tool holders can be moved to new positions very rapidly. As a result such apparatus can be employed for cutting glass sheets flowing through the cutting station at a very high rate.

It will be understood that the above description of the present invention is susceptible to various modifications, changes, and adaptations.

We claim:
1. Apparatus for the remote control displacement of at least one tool, to a desired position, along a predetermined path, comprising, in combination:
   (a) a guide member;
   (b) at least one tool holder for holding at least one tool and mounted on said guide member for displacement with respect thereto along such predetermined path;
   (c) driving means mounted for movement parallel to such path;
   (d) selectively actuatable clutch means carried by said tool holder in operative association with said driving means and actuatable independently of the movement of said driving means for selectively coupling said holder to said driving means for any desired period of time; and
   (e) selectively actuatable stopping means carried by said tool holder in operative association with a stationary part for selectively coupling said holder to such part, only when said stopping means are actuated, so as to lock said holder at any desired position along such path, said stopping means normally being deactuated when said clutch means are actuated.

2. An arrangement as defined in claim 1 wherein a portion of said guide member constitutes the stationary part.

3. An arrangement as defined in claim 1 wherein said driving means comprise at least one endless driven member having two opposed reaches movable simultaneously in opposite directions with respect to one another, and wherein said clutch means are arranged in operative association with one of said reaches.

4. An arrangement as defined in claim 3 wherein a single endless driven member is provided and said clutch means comprise two independently actuatable portions each operatively associated with a respective one of said reaches.

5. An arrangement as defined in claim 1 wherein said driving means comprise a rotatable screw-threaded spindle, and a carrier member having a bore which is threaded to mate with said spindle, said carrier member being mounted on said spindle for displacement therealong under the influence of spindle rotation.

6. An arrangement as defined in claim 1 wherein said clutch means and stopping means are arranged to be controlled by electrical signals.

7. An arrangement as defined in claim 6 wherein said clutch means and stopping means are constituted by electromagnetically actuatable elements.

8. An arrangement as defined in claim 1 for controlling the displacement of a plurality of tools, wherein there are provided a plurality of tool holders each holding a respective tool, and wherein said clutch means comprise a separate clutch unit carried by each said tool holder, and said stopping means comprise a separate stopping unit carried by each said tool holder.

9. Apparatus for the remote control displacement of at least one tool, to a desired position along a predetermined path, comprising, in combination:
   (a) a guide member;
   (b) at least one tool holder for holding at least one tool and mounted on said guide member for displacement with respect thereto along such predetermined path;
   (c) driving means mounted for movement parallel to such path;
   (d) selectively actuatable clutch means carried by said tool holder in operative association with said driving means for selectively coupling said holder to said driving means; and
   (e) selectively actuatable stopping means integral with said clutch means and carried by said tool holder in operative association with a stationary part for selectively coupling said holder to such part so as to lock said holder at any desired position along said path.

10. Apparatus for the remote control displacement of at least one tool, to a desired position along a predetermined path, comprising, in combination:
   (a) a guide member;
   (b) at least one tool holder for holding at least one tool and mounted on said guide member for displacement with respect thereto along such predetermined path;
   (c) driving means mounted for movement parallel to such path and including two endless driven members each having two opposed reaches movable simultaneously in opposite directions with respect to one another, and means for driving said two endless members in respectively opposite directions;
   (d) selectively actuatable clutch means carried by said tool holder in operative association with said driving means for selectively coupling said holder to said driving means, said clutch means being arranged for selectively coupling said holder to one of said reaches of either one of said endless members.

11. Apparatus for the remote control displacement of at least one tool, to a desired position along a predetermined path, comprising, in combination:
   (a) a guide member;
   (b) at least one tool holder for holding at least one tool and mounted on said guide member for displacement with respect thereto along such predetermined path;
(c) driving means mounted for movement parallel to such path;
(d) selectively actuatable clutch means, constituted by fluid pressure actuatable elements and arranged to be controlled by electrical signals, carried by said tool holder in operative association with said driving means for selectively coupling said holder to said driving means;
(e) selectively actuatable stopping means, constituted by fluid pressure actuatable elements and arranged to be controlled by electrical signals, carried by said tool holder in operative association with a stationary part for selectively coupling said holder to such part so as to lock said holder at any desired position along such path;
(f) a plurality of fluid supply lines connected for supplying fluid to said clutch means and said stopping means; and
(g) a plurality of electrically controllable fluid valves, one for each said supply line, each connected into its respective supply line for controlling the flow of fluid therethrough.

12. Apparatus for the remote control displacement of at least one tool, to a desired position along a predetermined path, comprising, in combination:
(a) a guide member;
(b) at least one tool holder for holding at least one tool and mounted on said guide member for displacement with respect thereto along such predetermined path;
(c) driving means mounted for movement parallel to such path;
(d) selectively actuatable clutch means carried by said tool holder in operative association with said driving means for selectively coupling said holder to said driving means;
(e) selectively actuatable stopping means carried by said tool holder in operative association with a stationary part for selectively coupling said holder to such part so as to lock said holder at any desired position along such path;
(f) a mechanical power source connected to said driving means for selectively moving said driving means at a high speed or a low speed; and
(g) an electrical control unit connected to said power source, said clutch means and said stopping means to supply electrical signals thereto for actuating said clutch means and said stopping means and for varying the speed at which said power source moves said driving means, said control unit being arranged for causing said power source to move said driving means at a low speed when said tool reaches a position which is a predetermined short distance from its desired stopping position.

13. An arrangement as defined in claim 12 for the remote control displacement of a plurality of tools, wherein there are provided a plurality of tool holders, each for holding a respective tool; said clutch means comprise a plurality of clutch units each carried by a respective one of said holders; said stopping means comprise a plurality of stopping units each carried by a respective one of said tool holders; and said control unit permits at least two of said tool holders to be displaced simultaneously and, when said tool holders are to be displaced by respectively different amounts, said control unit actuates said stopping unit of that tool holder which first arrives at a position a predetermined distance from its desired position, and, when the other of said tool holders moves to the same predetermined distance from its desired position, said control unit actuates said clutch unit of the first of said tool holders for recoupling said latter holder to said driving means and simultaneously actuates said power source for moving said driving means at its low speed until both of said tool holders reach their desired position.

14. Apparatus for the remote control displacement of at least one tool to a desired position along a predetermined path, comprising, in combination:
(a) a guide member;
(b) at least one tool holder for holding at least one tool and mounted on said guide member for displacement with respect thereto along such predetermined path;
(c) driving means mounted for movement parallel to such path;
(d) selectively actuatable clutch means carried by said tool holder in operative association with said driving means for selectively coupling said holder to said driving means;
(e) selectively actuatable stopping means carried by said tool holder in operative association with a stationary part for selectively coupling said holder to such part so as to lock said holder at any desired position along such path;
(f) actuating means for said clutch means and said stopping means, said actuating means being in the form of a tong device having a pair of arms pivotally mounted on said tool holder, each of said arms carrying one portion of said clutch means and one portion of said stopping means; and
(g) means connected to pivot said arms for selectively actuating either said clutch means or said stopping means.

References Cited
UNITED STATES PATENTS

| | | | |
|---|---|---|---|
| 1,067,461 | 7/1913 | Bradstreet | 83—562 X |
| 1,465,339 | 8/1923 | Brennan | 83—562 X |
| 3,176,566 | 4/1965 | Patterson | 83—433 X |
| 3,238,830 | 3/1966 | Backlund | 83—504 X |
| 3,319,500 | 5/1967 | Wild et al. | 83—487 X |
| 3,332,326 | 7/1967 | Haas | 83—433 X |

FOREIGN PATENTS 5,004  11/1932  Australia.

FRANK T. YOST, Primary Examiner

U.S. Cl. X.R.

83—433, 487, 562, 700